No. 716,112. Patented Dec. 16, 1902.
E. G. N. SALENIUS.
APPARATUS FOR COOLING MILK OR CREAM.
(Application filed Feb. 26, 1901.)
(No Model.)
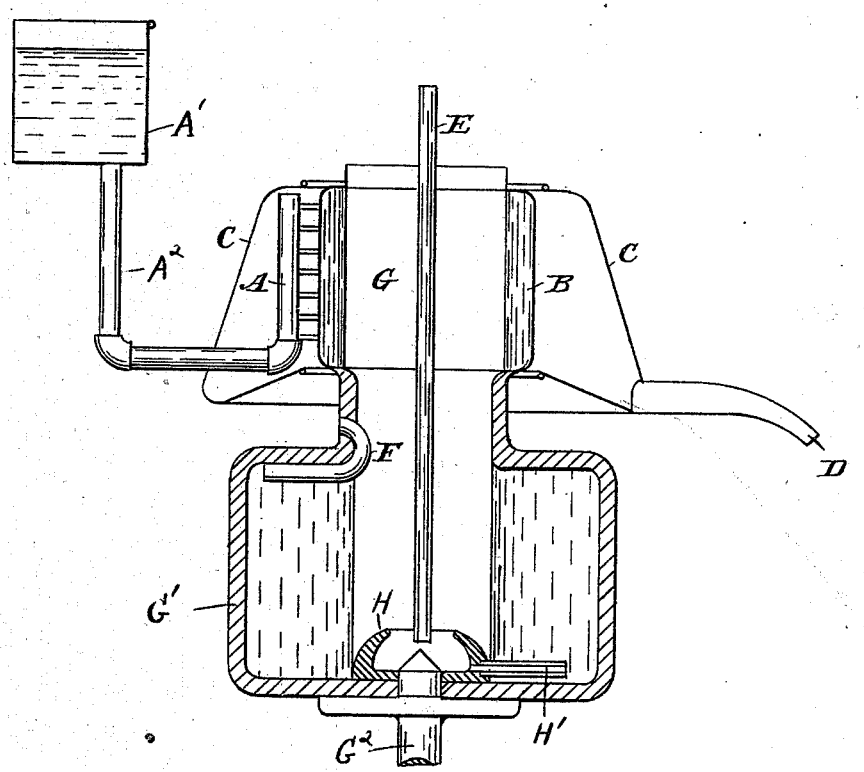

UNITED STATES PATENT OFFICE.

ERIK GUSTAF NICOLAUS SALENIUS, OF STOCKHOLM, SWEDEN, ASSIGNOR TO SALENIUS' WERKSTÄDER, MANUFACTURING FIRM, OF STOCKHOLM, SWEDEN.

APPARATUS FOR COOLING MILK OR CREAM.

SPECIFICATION forming part of Letters Patent No. 716,112, dated December 16, 1902.

Application filed February 26, 1901. Serial No. 48,930. (No model.)

*To all whom it may concern:*

Be it known that I, ERIK GUSTAF NICOLAUS SALENIUS, a subject of the King of Sweden and Norway, and a resident of Stockholm, in the Kingdom of Sweden, have invented certain new and useful Improvements in Apparatus for Refrigerating or Cooling Milk or Cream, of which the following is a specification.

The present methods of refrigerating milk or cream in centrifugal or churning machines are open to many objections, and it has by very numerous trials been ascertained that the desired effect has not been obtained. Moreover, the apparatus which have heretofore been constructed have in practical use proved to be too complicated and of limited durability.

The present invention refers to an apparatus for refrigerating milk or cream simultaneously with the churning or centrifugal action in an improved manner. By the improved apparatus I combine a separate cooling-chamber with the centrifugal apparatus inclosing the fluid to be treated and subject the wall or walls of said separate chamber to the action of fine jets of some suitable liquid, air, or gas at a convenient temperature. Instead of directing several jets against the wall or walls a single jet of some suitable extension in width may be used. This sprinkling or squirting thus supersedes other more or less complicated devices for refrigerating or heating. The heating or cooling action is due to the property of the fluid of absorbing heat when evaporating, whereby the fluid to be separated or churned can be brought to a lower temperature than the fluid itself used for the refrigeration. In this case the property of the fluid of producing a lower temperature when evaporating is still more prominent than when the evaporation takes place in the case of the fluid being in no motion or in a very slow motion. The rapid rotatory motion of a centrifugal apparatus—for instance, five thousand revolutions a minute—creates a very strong current of air whereby the greatest possible evaporation takes place, causing a corresponding lowering of temperature.

The device for carrying out the invention is represented in the accompanying drawing, which represents a central vertical section through a churn or a separating-compartment having a smooth wall situated above a centrifugal drum. The fluid to be used for refrigeration and to be directed against the wall can be of any kind having a suitable temperature, and even milk to be separated may be used as a refrigerating agent. The fluid may flow down from a reservoir situated at a higher level, or, by means of a pump or the like, may be forced into a pipe-conduit ending in a rose producing a number of jets, or the pipe may end in a mouthpiece more or less flattened, depending upon shape required to be imparted to the jet or jets.

The jet-pipe is shown at A in proximity to the wall B of the centrifugal apparatus and is provided with one or more rows of fine holes along the same.

A' is a reservoir for containing the fluid which flows through pipe $A^2$ to the vertically-disposed jet pipe or portion A. The used fluid is allowed to pass out in the usual way from a receiver C, situated around the centrifugal apparatus, through a nozzle D, from which it may be collected. The sweet milk or cream is fed through a central tube E to the bottom of the centrifugal apparatus, where it is separated in the usual way. The skim-milk flows out through the pipe F; but the cream passes through the churn or the refrigerating-compartment G, where it will either be churned to butter or flow out as refrigerated cream.

The lower part of the centrifugal apparatus is enlarged, as shown at G', and the whole centrifugal apparatus is mounted upon a vertical shaft $G^2$, which may be rotated in any suitable manner. A cup-shaped shield H encircles the lower end of the pipe E, from which leads a lateral discharge-pipe H'.

Having thus described my invention, what I claim is—

In combination in a centrifugal apparatus, a lower rotary compartment G', an upper cooling-compartment rotating therewith, and means for throwing a jet of fluid against the exterior of said cooling-chamber, substantially as described.

In witness whereof I have hereunto set my hand in presence of two subscribing witnesses.

ERIK GUSTAF NICOLAUS SALENIUS.

Witnesses:
   H. B. OHISSON,
   C. TH. SUNDHOLM.